SYSTEM FOR MANUFACTURING AT HIGH SPEED MAGNETIC SOUND RECORD SHEETS USED ON A MAGNETIC SOUND RECORD READING MACHINE

Filed Aug. 28, 1958

2 Sheets-Sheet 1

United States Patent Office 2,999,907
Patented Sept. 12, 1961

2,999,907

SYSTEM FOR MANUFACTURING AT HIGH SPEED MAGNETIC SOUND RECORD SHEETS USED ON A MAGNETIC SOUND RECORD READING MACHINE

Yasushi Hoshino, 462 1-chome, Tamagawa Okusawa-cho, Setagaya-ku, and Mamoru Namikawa, 664 Kugahara-cho, Ota-ku, both of Tokyo, Japan, and Shigezo Tochihara, Kawasaki-shi, Kanagawa, Japan (531 Matsunoki-Jyutaku, Matsunoki-cho, Suginami-ku, Tokyo, Japan)

Filed Aug. 28, 1958, Ser. No. 757,876
Claims priority, application Japan Sept. 2, 1957
6 Claims. (Cl. 179—100.2)

The present invention relates to a system for manufacturing at high speed magnetic sound record sheets used on a magnetic sound record reading machine, which process comprising a series of operations, in continuation, of coating magnetic coating film on a carrier made of paper, plastic, or like material and having a form of a letter writing paper of printing description on a surface of the carrier sheet, of magnetic printing of sound on the magnetic coating film, of piercing setting holes in the sheet and of cutting the sheet in a predetermined size; whereby a great number of magnetic sound record sheets in perfect condition are produced.

The magnetic sound record sheet to be manufactured according to the system of the present invention has a surface of magnetic sound record film and a surface of descriptions comprising sentences, pictures or other descriptions or combinations thereof, which are related to the sound recorded on the sheet, and the user of the sheet can see the descriptions while hearing the recorded sound and thus he will be able to understand better the descriptions than through descriptions such as in ordinary books, pamphlets, musical notes and the like and to obtain stronger impression than in the case depending merely on visual sense.

The sheets as described above may be compiled in a book form or may be used as advertisement papers or newspapers. In such a case, it is naturally required to produce a great number of sheets. In the manufacture of sheets of such a great number, if the operations of forming a magnetic sound coating film, printing of descriptions, magnetic printing of sound, piercing setting holes in a sheet and cutting of a sheet are to be carried out in respect of each individual sheet separately, it will require much labor and time. According to this invention, the operations as described above will be carried out continuously and simply and the labor and time will be lessened greatly to decrease the cost of production of sheets.

Now the system of the present invention will be explained in detail with reference to accompanying drawings wherein FIG. 1 is a diagrammatic side view of the whole system of the present invention;

Figures 1, 2, 3, 4, 5, 6, 7, 8:
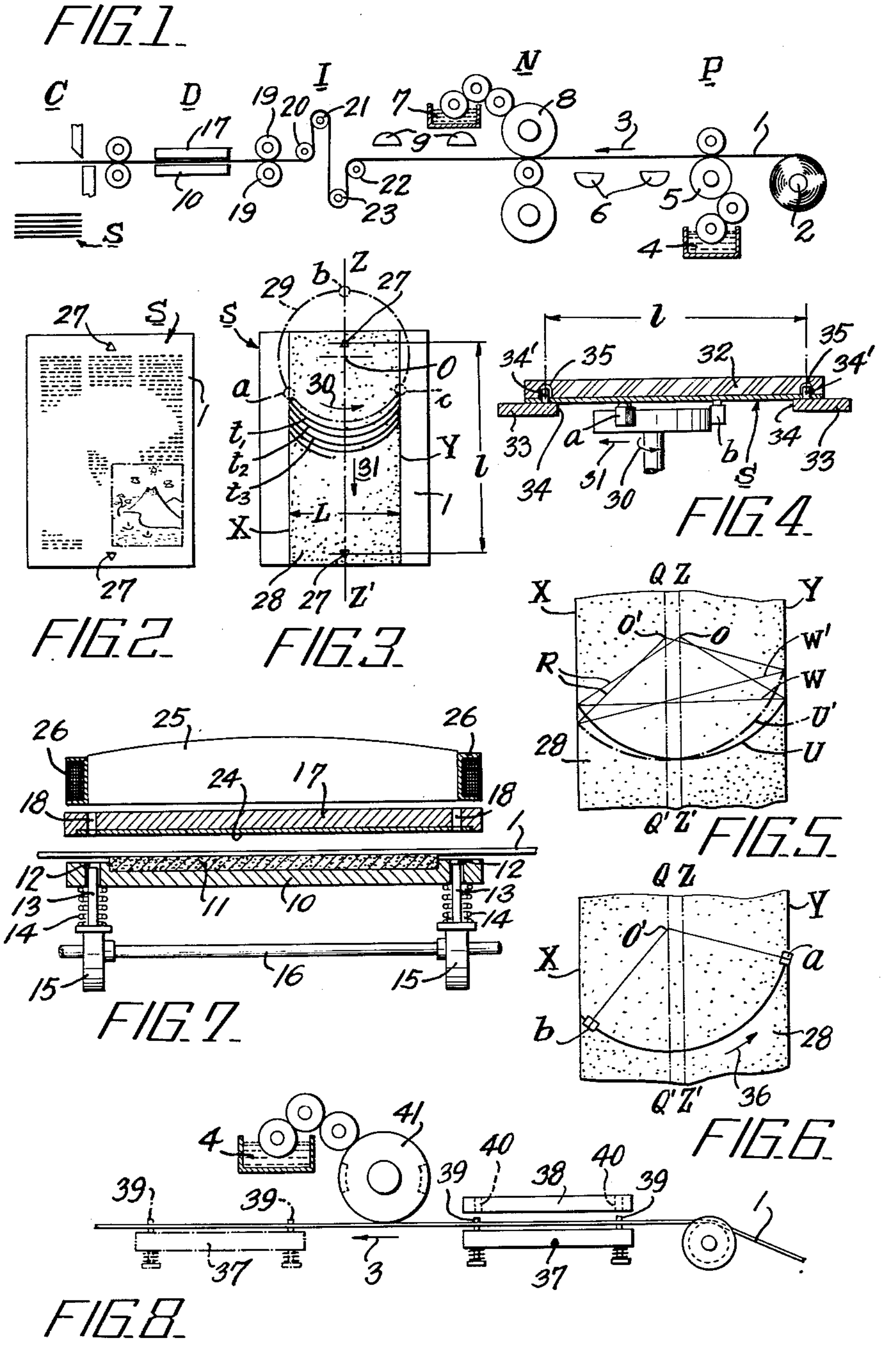
FIG. 2 is a front view of a magnetic sound record sheet.
FIG. 3 is a back view of the sheet of FIG. 2.
FIG. 4 is a diagrammatic view of some essential parts of a magnetic sound record reading machine.
FIGS. 5 and 6 are views illustrating the relationship between sound tracks and the magnetic coating film of a sheet.
FIG. 7 is a sectional view illustrating the relationship between a magnetic sound printing device and setting holes of a sheet.
FIG. 8 is a diagrammatic view of a system for carrying out correctly operations of piercing holes, magnetic film coating and magnetic sound printing.

In FIG. 1, a sheet 1 of paper, plastic or the like to be used as the basic body of magnetic sound record sheets is delivered in direction of arrow 3 from a reel 2. The sheet 1 is printed on one surface by a printing device P to have descriptions of letters, pictures, photographs, etc. to be seen by eyes and then the other surface of the sheet is coated with a magnetic sound record film by a magnetic sound recording film coating device generally shown by N. Then magnetic sound printing and piercing holes are carried out on the sheet by a device generally shown by D for simultaneous sound-printing and hole-piercing and cutting of the sheet in a proper size is carried out by a cutting device C. In the drawing, I represent an intermittent delivery device for conveying the sheet intermittently.

The printing device P may be any device which is used in conventional printing machines, for example, a gravure printing device. In the drawing, 4 represents printing ink which is printed on the sheet 1 through intermediate rollers by a printing roller 5. The printed sheet may be dried by means of infra-red drying lamps 6 or by any other proper means, for example, by an air blower provided in a proper place in order to accomplish drying quickly.

The magnetic coating film applying device N is similar to the printing device P and a fluid 7 containing magnetic powder is applied on the surface of the sheet 1 opposite to the surface having descriptions by means of a roller 8 through a group of intermediate rollers to give a magnetic coating film of exactly a predetermined width. This magnetic coating film may also be dried by infrared ray lamps 9, 9 or an air blower or any other suitable device arranged in a proper place.

The intermittent delivery device I has a pair of intermittently driven rollers 19, 19 for delivering the sheet intermittently from right to left, guiding rollers 20, 21, 22 in fixed positions and a vertically movable roller 23 placed on the sheet 1 which has been forwarded continuously by means of the magnetic coating film applying device N.

When the rollers 19, 19 are at rest, the roller 23 is lowered by its weight to keep the sheet 1 in properly stretched condition and when the rollers 19, 19 are in motion, the stored portion of the sheet formed by the lowering of the roller 23 is fed to left to carry out required delivery of the sheet.

The device D for printing magnetic sound record tracks on the sheet and piercing holes has, as shown in FIG. 7, a basic plate 10 provided with a rubber sheet 11. The basic plate 10 has, in proper places, holes 12, 12 in which cutters 13, 13 are inserted, which cutters being pressed down by springs 14, 14. Below the cutters 13, 13 are arranged cams 15, 15 rotated by a shaft 16. When the cams 15, 15 are rotated by the shaft 16, the cutters are moved vertically in the holes 12, 12 and according to the rotation of cams 15, 15, the cutters project out of the holes 13, 13 to pass through the holes of a sheet 24 on a cutter plate 17 having cutter holes 18, 18 in places corresponding to the holes 12, 12. The sheet 24 is a master sheet which has magnetic sound record already recorded which is to be printed therefrom on a plurality of other sheets. The sheet 24 is placed on the cutter plate 17, facing its magnetic coating film downwardly.

Returning to FIG. 1, the cutter plate 17 having the sheet 24 on its lower surface is lowered on the sheet 1 which has a magnetic coating film applied by the device to bring the two magnetic coating films into contact, and the cutters 13, 13 are raised to pierce holes in the sheets 1 and to maintain the two sheets 1 and 24 in right position.

When a magnetic field caused by direct current or alternative current of a determined intensity is applied to the overlapping sheets and the intensity of the current is gradually decreased to zero, the magnetic sound record tracks on the master sheet 24 will be printed on the magnetic coating film of the sheet 1, while the magnetic sound record on the master sheet 24 is preserved for further printing on a following sheet and thus printing of the sound tracks on a plurality of sheets can be attained by repetition of similar operation. For applying a magnetic field to the sheets, an electric magnet comprising a core 25 and a coil 26 as shown in FIG. 7 may be energized by supplying current and then the intensity of the current may gradually decrease to zero or a permanent magnet which is moved to and from the sheets to change the intensity of the magnetic field applied to the sheets may be used. Lastly the cutting device C will be operated to cut the recorded sheet into a proper size with a knife.

In a magnetic sound record sheet used on a magnetic sound record reading machine, it is important that the relationship between the setting holes of the sheet and the printed magnetic sound record tracks is precisely correct. It will be apparent that when the sheet is printed and pierced by a same device as described above, the relationship between the setting holes 27 and the magnetic sound record tracks can always be made perfectly correct and when such a sheet is placed on a magnetic sound recording machine perfect reproduction can be obtained.

FIG. 2 is the front surface view and FIG. 3 is the back surface view of a sheet S as manufactured by the process as described above. On the back surface, a magnetic sound recording film is formed between parallel lines X and Y having determined width L.

A magnetic sound record reading machine of sister invention of the present invention (U.S. patent application No. 757,875, now U.S. Patent No. 2,962,559) has a turn table 29 rotatable around its center O. A plurality (3 in the illustrated example) of sound recording or reproducing heads *a*, *b*, *c* are provided around the circumference of the turn table 4 at equal intervals, the head gap of each head being directed to the center O.

The linear distances *a—b*, *b—c* and *c—a* between the heads are equal to the width of L of the magnetic coating film respectively. The turn table is moved in the linear direction as shown by arrow 31 while it is rotated in the direction of arrow 30 as shown in FIG. 3. When the sheet is placed facing the magnetic coating film 28 downward on the turn table 31 to maintain contact with one of the heads of the turn table in turn, and the turn table is moved in the linear direction as shown in FIG. 3, sound tracks $t_1$, $t_2$, $t_3$—of arc shape will be formed on the magnetic coating film 28 by the heads when the heads are sound recording heads. In this operation, the heads act to push the sheet S upwardly and hence a pressing plate 32 is provided to keep the sheet S in a fixed position as shown in FIG. 4.

In FIG. 4, a panel 33 of a magnetic sound record reading machine has a window 34 which is adapted to expose the magnetic sound record film of a sheet set on the panel to face to the turn table 29 of said machine so that the heads of the turn table will record or reproduce sound on the magnetic film when operated. The pressing plate 32 is provided with holes 35, 35 adapted to allow entering the guide pins 34′, 34′ on the panel therein.

When the sheet S is a magnetic sound record sheet already recorded and the heads are sound reproducing heads, of course the recorded sound will be reproduced by similar operation. However, it is evident that the desired sound reproduction is not obtainable if the recorded sheet is not set on a magnetic sound record reading machine to have exactly same position as at the time of recording sound in relation to the turn table 29 and consequently to the heads.

FIGS. 5 and 6 illustrate what will happen if the center O of the turn table 29 moves along a line different from the center line Z—Z′ of the magnetic coating film of a sheet demarcated by two parallel lines X, Y. In FIG. 5, Z—Z′ is the center line of the magnetic coating film, and Q—Q′ is a line apart from the center line Z—Z′. When the center O of the turn table is on the line Z—Z′, the arc described by a head of the turn table on the magnetic coating film will be U while the center O is on the line of Q—Q′, the arc will be U′. As it is apparent from the drawing the chord W′ of U′ is longer than the chord W of U since the former is an inclined line while the latter is perpendicular to lines X and Y. It is apparent therefore that the arc U′ is longer than the arc U. This means that when the turn table is rotated around the center O′ which is not on the central line Z—Z′, two heads *a* and *b* will come from time to time in contact with the magnetic coating film at the same time as shown in FIG. 6. It is evident that under such conditions, good recording or reproducing cannot be attained.

Accordingly in order to secure correct positioning of sheets for recording and reproduction, a plurality of guide pins 34′, 34′ (two in the illustrated embodiment) are provided on a panel 33 for setting a sheet of a magnetic sound record reading machine and corresponding number of setting holes 27, 27 are provided in a magnetic sound record sheet. The distance 1 between said setting holes 27, 27 is equal to the distance between the guiding pins 34′, 34′ as shown in FIG. 3 and the size and shape of holes 27, 27 are made to fit the guiding pins. It will be needless to say the number of guide pins and setting holes is not limited to two but may be increased as desired.

In the case of FIG. 3, the sheet is manufactured in such a way as the line Z—Z′ connecting the two setting holes 27, 27 will pass the center line between the two border parallel lines X, Y as illustrated in the drawing. On the other hand, the magnetic sound record reading machine is constructed in such a way as the center O of the turn table 29 will proceed along the center line Z—Z′ of the sheet in operation when the sheet is set on the magnetic sound record reading machine by means of the guide pins of the machine and the setting holes of the sheet.

With the arrangement as described above, the sheet will be always set on the machine to give perfect reproduction of sound. While explanation is made in the above in respect of the case where the number of the guide pins and the setting holes is two, the number and positions of the guide pins and setting holes may be changed, the only requirement for satisfactory reproduction of sound being that the center O of the turn table 29 must always pass along the line Z—Z′ of the sheet set on the machine in operation.

According to this invention, the setting holes of a sheet will be pierced when the sheet is held in the position for printing magnetic sound record. Accordingly, the sheets printed according to the present invention have always correct relationship between the setting holes and printed sound records and, when set on a magnetic sound record reading machine, perfect reproduction of sound will be obtained.

One embodiment of a device for printing magnetic sound record and piercing holes on sheets has already been explained with reference to FIG. 7.

FIG. 8 illustrates another embodiment of a device for applying magnetic coating film on sheets in correct position in relation to setting holes. According to this embodiment, a sheet 1 is forwarded intermittently to a support plate 37. This support plate corresponds to the plate 10 of FIG. 7 and has similar construction. Over the plate 37 is arranged another plate 38 which corresponds to the cutter plate 17 of FIG. 7 and has similar construction thereto. When the sheet is advanced on the plate 37 by a determined distance, the proceeding of the sheet 1 is stopped and the plate 38 is lowered to hold the sheet 1 between the two plates 37, 38. Now the cutters 39, 39 are operated to rise through the holes of the plate 37 and the holes 40 of the plate 38 thereby piercing holes in the sheet 1. When the operation of piercing holes is completed, the plate 38 is raised but cutters 39, 39 are left still in engagement with the sheet 1 and the sheet 1 is advanced in this condition in the direction of arrow 3 to a roller 41 which is similar to the roller 8 of FIG. 1 and is adapted to apply material containing magnetic powder.

According to this device, magnetic coating film is applied on a sheet which is held in correct position by cutters 39 and the support plate 37, and therefore the relationship between the setting holes and the magnetic coating film is made always correct. After the application of the magnetic coating film, the cutters are lowered, and the plate 37 may be returned to the original position for piercing operation. In the commercial operation, a number of plates 37 are employed so that piercing holes and applying magnetic coating film may be carried on continuously at high speed. Cutting of the sheet in a predetermined size may be carried out simultaneously at the time of piercing holes.

The sheet manufactured by the device as described above has setting holes and the magnetic coating film at correct positions, and hence when it is set on a magnetic sound record reading machine for sound recording, a perfect magnetic sound record can be produced. The sheet after application of the magnetic coating film may also be passed to a magnetic sound printing device, keeping it in engagement with cutters.

Figure 9:
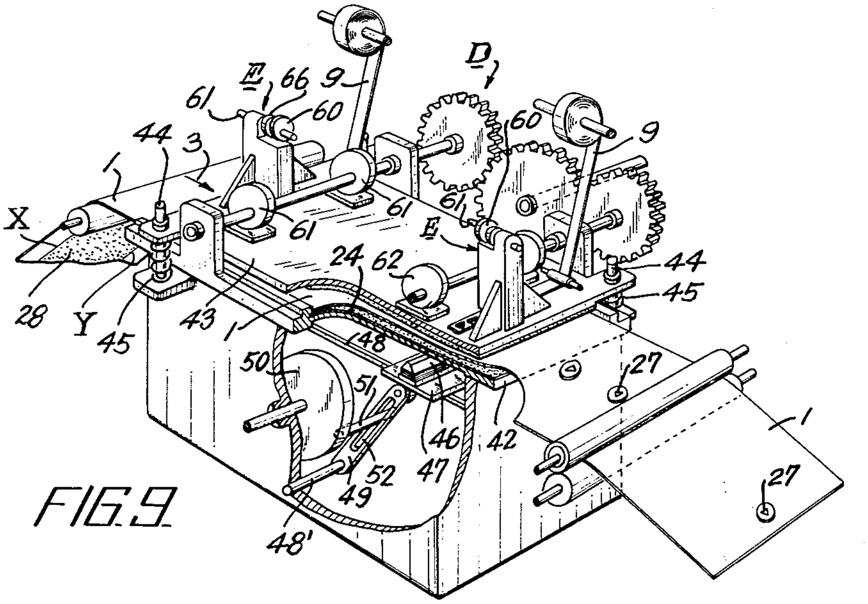
FIG. 9 is a perspective view illustrating a device for automatic enforcement of holes of a sheet.

FIG. 9 illustrates another embodiment of a device for magnetic sound record printing and piercing setting holes a little different from the embodiment of FIG. 7, and according to this device, the pierced setting holes can be reinforced simultaneously.

In the drawing, 1 represents a sheet which has magnetic coating film 28 between two parallel lines X and Y applied by means as already explained. The sheet 1 is carried intermittently in the direction of arrow 3 to a device D for magnetic sound printing and piercing holes. The device D has a support plate 42 on which a master sheet 24 is placed in a fixed position facing its magnetic sound record film upwardly.

Above the sheet, a pressing plate 43 is arranged over the support plate 42. This pressing plate 43 is covered by a layer of elastic material such as sponge rubber and is movable up and down under the guidance of studs 44, 44 and is normally urged upwardly by springs 45, 45. When the sheet 1 is brought to a correct position over the master sheet 24, the pressing plate 43 is lowered against springs 45, 45 by means of eccentric cams 61, 62 which are rotated to press down the pressing plate 43. Under this condition, the magnetic coating film of the sheet 1 and the magnetic coating film of the master sheet 24 are brought in close contact thanks to the presence of an elastic layer of a material like sponge rubber on the pressing plate 43. In this condition, magnetic sound printing is carried out by an electric magnet 46 supported on a table 47 slidable on rails 48, 48 by energizing the electric magnet 46 and sliding the table 47 along the master sheet 24. In the embodiment of FIG. 9, the table 47 is connected with a lever 49 rotatable around a fixed shaft 48'. The lever 49 has a slot 52 in which a pin 51 is engaged. This pin is fixed on a wheel 50 rotatable by a shaft in a fixed position. It will be apparent that when the wheel 50 is rotated the table 47 supporting the electric magnet 46 is moved on the rails 48, 48 to carry out magnetic sound printing on the sheet 1. The device D of the example has further a device E for giving reinforced setting holes to the sheet 1.

Figures 10, 11:
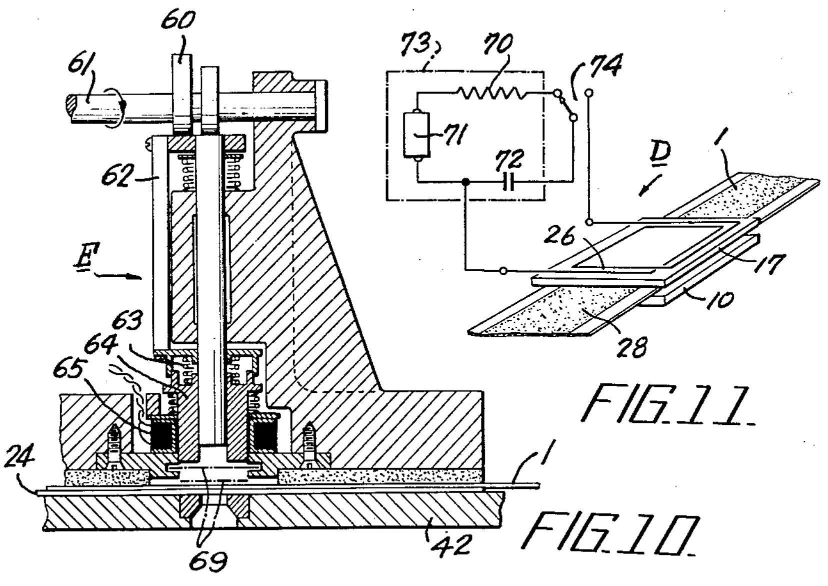
FIG. 10 is a sectional view in detail of the part of a device of FIG. 9 for piercing a hole.
FIG. 11 is a view illustrating a wiring system in a magnetic sound printing device.

A magnetic sound record sheet is often used on a magnetic sound record reading machine and setting holes are apt to be broken. It is therefore desirable to reinforce the holes. The device E of the example has, as shown in FIG. 10, a cutter 64 for cutting a reinforcement piece 69 and a cutter 67 for piercing holes on the sheet 1. When the sheet 1 is in contact with the master sheet 24 on the support plate, the cutter 64 is lowered to cut the reinforcement piece 69 in a desired size greater than the size of a hole to be pierced and the cut piece is pressed on the sheet. The cutter 64 is surrounded by a heater 65 (which may be an electric heater) and the cut reinforcement piece 69 is pasted on the sheet 1 when it is pressed against the sheet 1 inasmuch as the thermoplastic material of the reinforcement piece is heated by the cutter 64 heated by the heater 65. Then the cutter 67 is lowered to pierce a hole on the sheet 1 having the reinforcement piece pasted thereon and thus a hole reinforced by the reinforcement piece 69 is formed.

For moving the cutter 64 and the cutter 66, cams 60 and 66 are provided on a shaft 61 and when the shaft 61 is rotated the cutter 64 which is normally urged by a spring in raised position is lowered by the cam 60 and the cutter 67 is lowered by the cam 66.

FIG. 11 illustrates an embodiment for creating a magnetic field by an electric magnet. In the drawing, a sheet 1 is placed on a support plate 10, having a magnetic coating film 28 in contact with the magnetic coating film of a master sheet (which does not appear in the drawing) arranged on the lower surface of a pressing plate 17.

While the two sheets are in contact as described above, electricity is supplied to a coil 26 wound around a magnetic core to produce a magnetic field for an instant thereby to perform magnetic printing instantaneously. Such an instantaneous energization of the coil may be attained, for example, by providing a condenser discharger 73 having a condenser 72, an electric source 71 and a resistance 70 in the electricity system of the coil 26 so that high frequency electricity stored in the condenser is supplied to the coil 26 through a switch 74. The electrostatic energy in the condenser is discharged from the coil and magnetic printing will be completed almost instantaneously. Moreover when the discharge of electricity in the condenser comes to an end, the magnetic field of the coil will become automatically nil. When such a device is used, satisfactory magnetic printing will be performed very simply and instantaneously.

We claim:

1. Apparatus for manufacturing magnetic sound record sheets from a continuous blank sheet and a master record comprising printing means, supply means for continuously supplying the blank sheet to said printing means; coating means adjacent said printing means for applying a magnetic film to said sheet, drying means adjacent said printing and coating means to dry said sheet, converting means operatively associated with said drying means for converting the movement of said sheet from a continuous to an intermittent movement, copy means for transferring information from said master record to said magnetic film, punch means for punching guide holes into said sheet, and cutting means for cutting the sheet into predetermined lengths.

2. Apparatus as claimed in claim 1 wherein said converting means comprises a first roller for receiving the continuously moving sheet, means supporting said roller for rotation on a fixed axis, a second roller positioned to receive the sheet from the first roller, means supporting said second roller for rotation on a movable axis, and a third roller positioned to receive said sheet from the second roller and intermittently rotatable, and means supporting the third roller for rotation on a fixed axis.

3. Apparatus as claimed in claim 1 wherein said copy and punch means are combined as a single unit.

4. Apparatus as claimed in claim 1 wherein said copy means comprises means for directing a magnetic field through said master record.

5. Apparatus as claimed in claim 1 comprising means for reinforcing said holes.

6. Apparatus as claimed in claim 1 wherein said copy means comprises a magnet and a table supporting said magnet for moving the same along said master record.

References Cited in the file of this patent

UNITED STATES PATENTS

| | | |
|---|---|---|
| 2,743,988 | Allyn | May 1, 1956 |
| 2,784,392 | Chaimowicz | Mar. 5, 1957 |
| 2,867,692 | Camras | Jan. 6, 1959 |